(12) United States Patent
Jahanbanifar et al.

(10) Patent No.: US 10,768,945 B2
(45) Date of Patent: Sep. 8, 2020

(54) SEMANTIC WEAVING OF CONFIGURATION FRAGMENTS INTO A CONSISTENT CONFIGURATION

(71) Applicants: Azadeh Jahanbanifar, Montreal (CA); Maria Toeroe, Montreal (CA); Ferhat Khendek, Montreal (CA)

(72) Inventors: Azadeh Jahanbanifar, Montreal (CA); Maria Toeroe, Montreal (CA); Ferhat Khendek, Montreal (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 205 days.

(21) Appl. No.: 15/769,590

(22) PCT Filed: Mar. 21, 2016

(86) PCT No.: PCT/IB2016/051588
§ 371 (c)(1),
(2) Date: Apr. 19, 2018

(87) PCT Pub. No.: WO2017/109586
PCT Pub. Date: Jun. 29, 2017

(65) Prior Publication Data
US 2018/0314534 A1    Nov. 1, 2018

Related U.S. Application Data

(60) Provisional application No. 62/270,784, filed on Dec. 22, 2015.

(51) Int. Cl.
*G06F 15/177* (2006.01)
*G06F 9/00* (2006.01)
(Continued)

(52) U.S. Cl.
CPC ............ *G06F 9/44505* (2013.01); *G06F 8/10* (2013.01); *G06F 8/35* (2013.01); *G06F 8/71* (2013.01)

(58) Field of Classification Search
CPC .......... G06F 9/44505; G06F 8/35; G06F 8/71; G06F 8/10
See application file for complete search history.

(56) References Cited

U.S. PATENT DOCUMENTS 7,526,503 B2    4/2009    Bernstein et al.
8,689,173 B2    4/2014    Elaasar
(Continued)

FOREIGN PATENT DOCUMENTS

WO    2015/173706 A1    11/2015

OTHER PUBLICATIONS

Azadeh Jahanbanifar et al., Partial Validation of Configurations at Runtime, 2015 IEEE 18th International Symposium on Real-Time Distributed Computing, IEEE Computer Society, pp. 288-291.
(Continued)

*Primary Examiner* — Xuxing Chen
(74) *Attorney, Agent, or Firm* — Julie Dufort; Ericsson Canada Inc.

(57) ABSTRACT

A system configuration is generated by integrating source models. Transformations are generated according to a weaving model that specifies relations among metamodels of the source models and the system configuration. The transformations, when executed, transform the source models into the system configuration that includes target entities. From the transformations, one or more integration constraints are generated for each target entity to be created or modified by an operation of the transformations. The integration constraints describe semantics of the relations specified by the weaving model. System configuration constraints are (Continued)

formed to include the integration constraints in addition to constraints of each source model. The transformations are executed to transform the source models into the system configuration to generate the system configuration obeying the system configuration constraints.

25 Claims, 13 Drawing Sheets

(51) Int. Cl.
- *G06F 9/24* (2006.01)
- *G06F 9/445* (2018.01)
- *G06F 8/10* (2018.01)
- *G06F 8/35* (2018.01)
- *G06F 8/71* (2018.01)

(56) References Cited

U.S. PATENT DOCUMENTS

2009/0144319 A1 6/2009 Panwar et al.
2017/0140072 A1* 5/2017 Sidorenko ............... G06F 17/11

OTHER PUBLICATIONS

Azadeh Jahanbanifar et al., A Model-Based Approach for the Integration of Configuration Fragments, Springer International Publishing Switzerland 2015, pp. 125-136.
Azadeh Jahanbanifar et al., Semantic Weaving of configuration fragments into a consistent system configuration, Springer Science+ Business Media New York 2016, 18 pages.
TH. Reiter et al., Model Integration Through Mega Operations, Proceedings Workshop on Model-driven Web Engineering (MDWE 2005), Australia, Sydney, pp. 20-29.
International Search Report from corresponding application PCT/IB2016/051588.

* cited by examiner

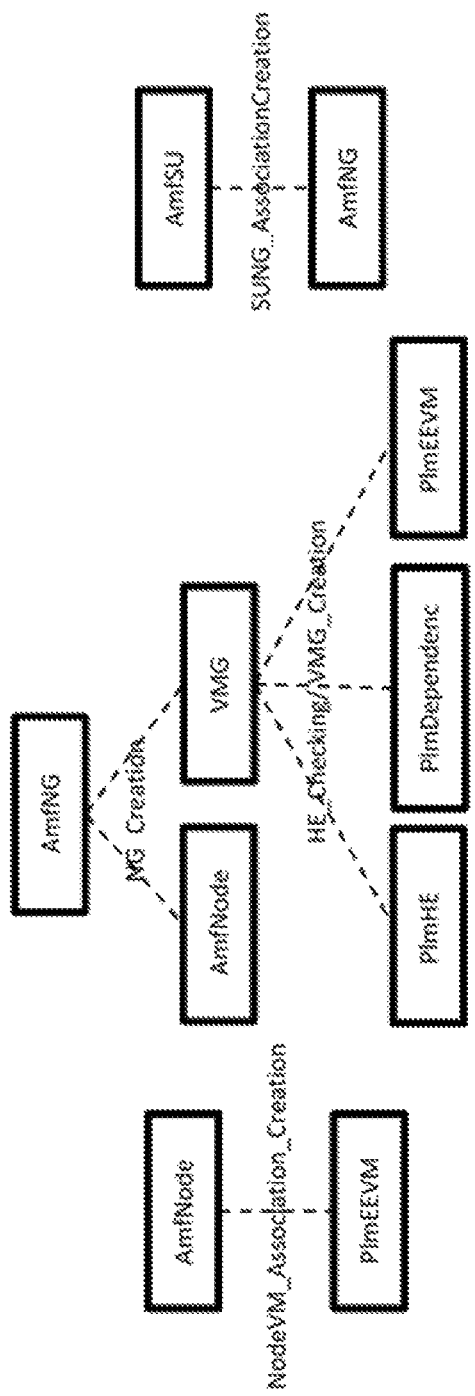
FIG. 10A
FIG. 10B
FIG. 10C
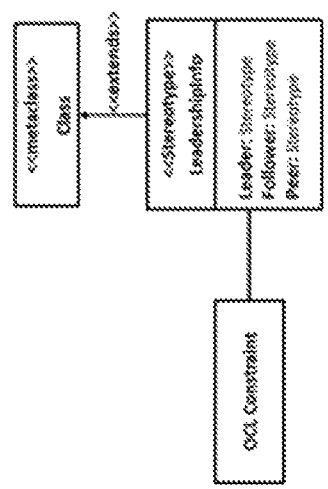
FIG. 11

SEMANTIC WEAVING OF CONFIGURATION FRAGMENTS INTO A CONSISTENT CONFIGURATION

CROSS-REFERENCE TO RELATED APPLICATIONS

This application is a 35 U.S.C. § 371 national phase filing of International Application No. PCT/IB2016/051588, filed Mar. 21, 2016, which claims the benefit of U.S. Provisional Application No. 62/270,784, filed Dec. 22, 2015, the disclosures of which are incorporated herein by reference in their entireties.

TECHNICAL FIELD

Embodiments of the invention generally relate to system configuration management.

BACKGROUND

In order to handle complexity, large computing systems are generally built using the principle of separation of concerns. Different services or aspects are considered separately before integration. For instance, software and hardware aspects of a computing system may be considered separately before integration, or the functional, availability, performance or security aspects can be considered separately before integration. The separation of concerns principle eases the development process and increases reusability even if the integration may pose its own challenges. As the different aspects or services are considered separately, their respective configurations are also developed separately.

It is a challenge to integrate these configurations into a consistent system configuration to avoid conflicting management actions or actions from one aspect that may lead to malfunctioning of other aspects. The complexity of this integration stems from the potential overlap between the entities of the different aspect configurations (i.e. different logical representations of the same entity) and from the complex relationships among the entities of these different configurations, also referred to as configuration fragments. It is also a challenge for the resulting system to meet the targeted properties of the different aspects, such as availability, performance, security, etc.

SUMMARY

In one embodiment, a method is provided for integrating source models into a system configuration. The method comprises: generating transformations according to a weaving model which specifies relations among metamodels of the source models and the system configuration. The transformations, when executed, transform the source models into the system configuration including a plurality of target entities. The method further comprises: generating, from the transformations, one or more integration constraints for each target entity to be created or modified by an operation of the transformations, wherein the integration constraints describe semantics of the relations specified by the weaving model; forming system configuration constraints to include the integration constraints in addition to constraints of each source model; and executing the transformations to transform the source models into the system configuration to thereby generate the system configuration obeying the system configuration constraints.

In another embodiment, there is provided a network node comprising processing circuitry and memory. The memory contains instructions executable by the processing circuitry to integrate source models into a system configuration. The network node is operative to generate transformations according to a weaving model which specifies relations among metamodels of the source models and the system configuration. The transformations, when executed, transform the source models into the system configuration including a plurality of target entities. The network node is further operative to: generate, from the transformations, one or more integration constraints for each target entity to be created or modified by an operation of the transformations, wherein the integration constraints describe semantics of the relations specified by the weaving model; form system configuration constraints to include the integration constraints in addition to constraints of each source model; and execute the transformations to transform the source models into the system configuration to thereby generate the system configuration obeying the system configuration constraints.

In yet another embodiment, there is provided a network node operative to integrate source models into a system configuration. The network node comprises a transformation generator module adapted to generate transformations according to a weaving model which specifies relations among metamodels of the source models and the system configuration. The transformations, when executed, transform the source models into the system configuration including a plurality of target entities. The network node further comprises: an integration constraints generator module adapted to generate, from the transformations, one or more integration constraints for each target entity to be created or modified by an operation of the transformations, wherein the integration constraints describe semantics of the relations specified by the weaving model; a system configuration constraints forming module adapted to form system configuration constraints to include the integration constraints in addition to constraints of each source model; and a transformation execution module adapted to execute the transformations to transform the source models into the system configuration to thereby generate the system configuration obeying the system configuration constraints.

In one embodiment, a method is provided for integrating source models into a system configuration. The method comprises: initiating an instantiation of a server instance in a cloud computing environment which provides processing circuitry and memory for running the server instance. The server instance is operative to: generate transformations according to a weaving model which specifies relations among metamodels of the source models and the system configuration. The transformations, when executed, transform the source models into the system configuration including a plurality of target entities. The server instance is further operative to: generate, from the transformations, one or more integration constraints for each target entity to be created or modified by an operation of the transformations, wherein the integration constraints describe semantics of the relations specified by the weaving model; form system configuration constraints to include the integration constraints in addition to constraints of each source model; and execute the transformations to transform the source models into the system configuration to thereby generate the system configuration obeying the system configuration constraints.

BRIEF DESCRIPTION OF THE DRAWINGS

Embodiments will now be described, by way of example only, with reference to the attached figures.

FIGS. 10A, 10B and 10C illustrate additional examples of derivation trees according to one embodiment.

FIG. 11 illustrates an extension of a constraint class with leadership information according to one embodiment.

DETAILED DESCRIPTION

Figure 1B:
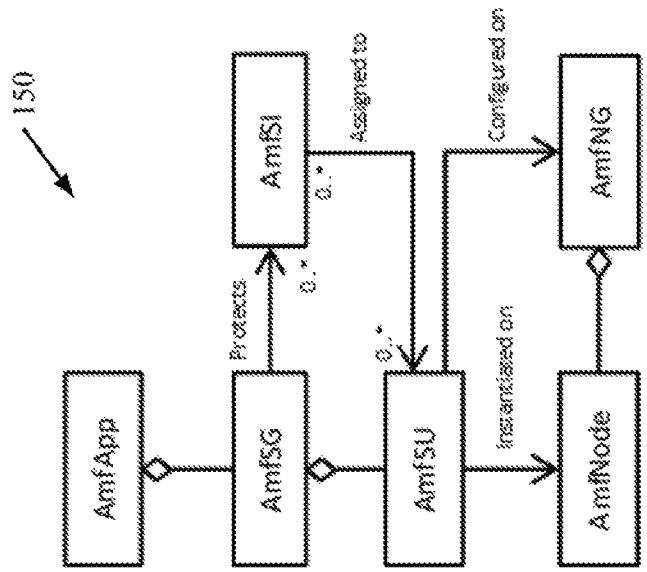
FIG. 1B illustrates a portion of an AMF configuration metamodel according to one embodiment.

Reference may be made below to specific elements, numbered in accordance with the attached figures. The discussion below should be taken to be exemplary in nature, and should not be considered as limited by the implementation details described below, which as one skilled in the art will appreciate, can be modified by replacing elements with equivalent functional elements.

A model driven approach for integrating configuration fragments is described herein. The model driven approach is based on the concept of model weaving. Model weaving allows for relating different models—for example, models that represent configuration fragments and referred to as configuration fragment models—by defining links between their entities. These links form a weaving model which conforms to a weaving metamodel. Model weaving has been widely used for model integration, model transformation, model merging, etc. However, the focus so far has been primarily on the static mapping of entities without considering the semantics of the relations among the different models. The model driven approach described herein takes into account the semantics of these relations, and targets some desired properties of the resulting system configuration model. The model driven approach generates a consistent system configuration model which contains all the entities from the configuration fragments, the constraints of each configuration fragment as well as the constraints reflecting the targeted properties of the integration. The latter constraints are generated automatically to capture the targeted properties entailed by the weaving links.

The model driven approach for integrating configuration fragments takes into account the properties of the target system configuration. The weaving model is used to capture the mapping between the elements of the different configuration profiles. New link types are introduced to capture the special relations, i.e. integration semantics, between the entities of these profiles in a weaving model, i.e. they are added to the weaving metamodel. Using a set of Atlas Transformation Language (ATL) transformations, a consistent system configuration is generated from the weaving. Although the ATL transformations incorporate the integration semantics into generation of the system configuration, the integration semantics are not reflected in the system configuration profile. The approach described herein adds the integration semantics as integration constraints into the system configuration profile in order to guard the consistency of system configuration models against unsafe runtime modifications.

The model driven approach allows for the reuse and the extension of the system configuration generation process as the link types were defined once and reused for the mapping of different entities of the configuration fragments. Other profiles may also be added to the process using the same or new link types. The automated generation of system configurations from different input configurations results in saving time and reducing efforts needed for the task.

In the following description, the Service Availability Forum (SA Forum) middleware is used as a running example in describing the model driven approach. The SA Forum middleware has been developed by a consortium of telecommunication and computing companies to support the development of Highly Available (HA) systems from Commercial-Off-The-Shelf (COTS) components. It consists of several services and frameworks, which represent and control specific aspects of the system and collaborate with each other. Many of these services and frameworks (which are also referred to herein as services), operates according to a configuration that specifies the organization and the characteristics of the system and/or application resources under their control. This disclosure focuses on the configurations of two SA Forum services: the Availability Management Framework (AMF), which manages the redundant software entities for maintaining the availability of application services, and the Platform Management (PLM) service which is responsible for providing a logical view of the platform entities (hardware and low level software entities) of the system. Thus, they represent different aspects of a system and are considered as configuration fragments. The configurations for these services are described using Unified Modeling Language (UML) profiles. The structure and semantics of the relations between these profiles are captured in a weaving model, which is later used to generate the system configuration including the constraints reflecting the targeted properties of the integration. Defining the relations between the profiles at a higher level of abstraction through a weaving model provides reusability of the link types, increases the extensibility (by allowing more models to be added) and automates the integration process.

A motivating scenario is introduced herein as a running example to illustrate the model driven approach for the integration of configuration fragments and constraint generation. The following description focuses on the AMF and PLM services, their respective configurations, the relations between these configuration fragments and their integration.

Figure 1A:
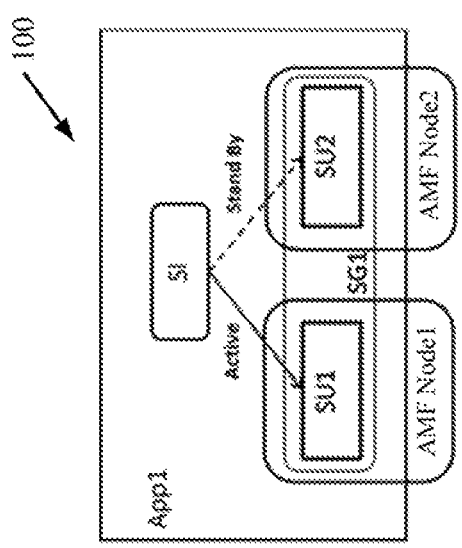
FIG. 1A illustrates an example of an Availability Management Framework (AMF) configuration of an application according to one embodiment.

AMF manages the availability of application services based on the AMF configuration of the application, which describes the organization and the characteristics of the resources composing this application. A simplified example of an AMF configuration 100 of an application is shown in FIG. 1A. In an AMF configuration, the service provider entities are called Service Units (SUs). The workload provisioned by an SU is represented as a Service Instance (SI). A group of redundant SUs providing and protecting the same SIs forms a Service Group (SG). An application may consist of a number of SGs. At runtime, to provide and protect an SI, AMF assigns the SI in the active and standby roles to the SUs of the SG. In case of the failure of the SU with the active assignment, AMF dynamically moves the active assignment from the faulty SU to the standby. Each SU is instantiated on an AMF Node, which is a logical container of the SUs. SUs and SGs can be configured to be hosted on a particular group of AMF nodes referred to as a Node Group (NG). This means that such an SU/SG (the SUs of the SG) can be instantiated only on the Nodes of that Node Group. An AMF configuration consists of these entities, their types and their attributes.

The concepts in an AMF configuration, their relationships, and the related constraints are captured in an AMF configuration metamodel. A portion of this metamodel 150 is shown in FIG. 1B. Subsequently, an AMF UML profile is defined by mapping the AMF configuration metamodel to the UML metamodel. The complete definitions of the AMF configuration metamodel and the respective AMF UML profile are discussed in Salehi et al, A UML-Based Domain Specific Modeling Language for the Availability Management Framework, 12*th IEEE International High Assurance Systems Engineering Symposium*, San Jose (2010). In the configuration integration to be described herein, this AMF UML profile is used as an input.

Figures 2A, 2B:
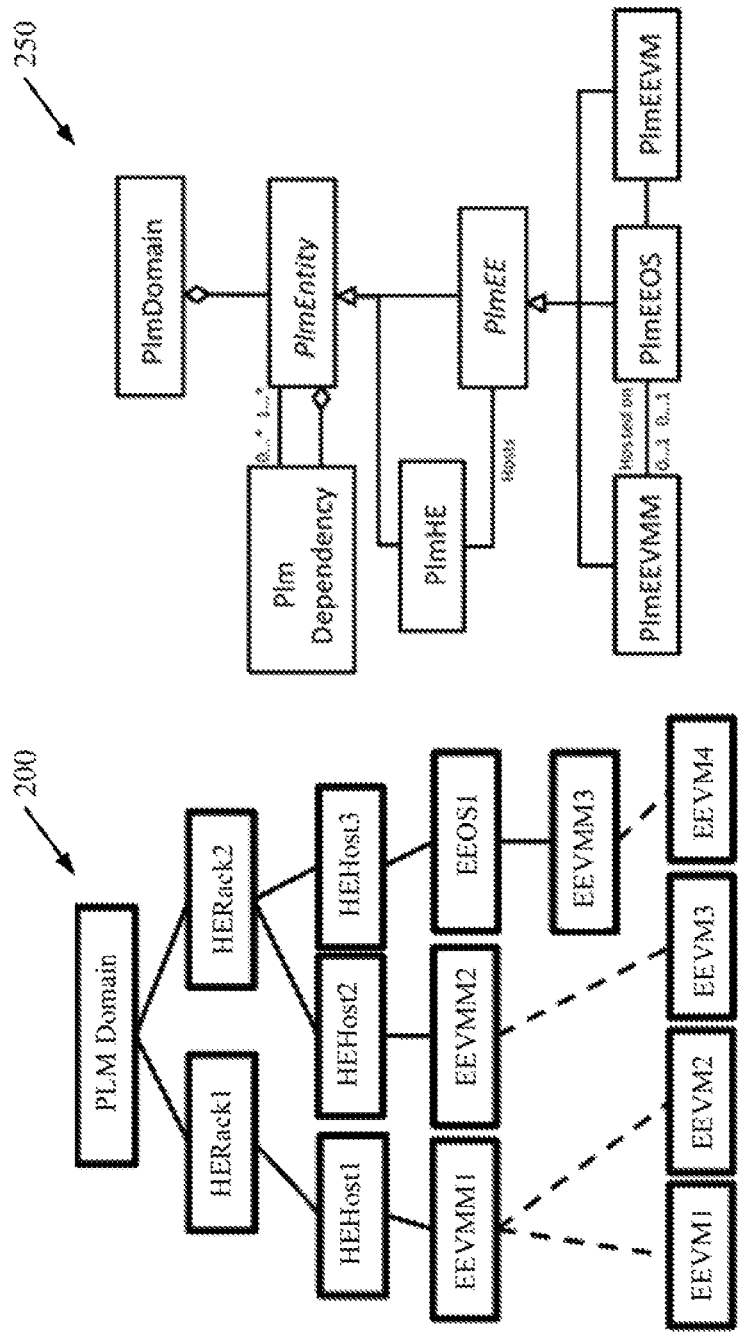
FIG. 2A illustrates an example of a Platform Management (PLM) configuration according to one embodiment.
FIG. 2B illustrates a portion of a PLM configuration metamodel according to one embodiment.

The PLM service is responsible for providing a logical view of the platform entities of the system, which includes the Hardware Elements (HEs) and the low level software entities also known as the Execution Environments (EEs). A PLM configuration represents their logical view. The PLM service manages the platform entities and acts as a mediator between the upper layers including AMF and the low level software and the hardware part of the system. A simple example of a PLM configuration 200 is shown in FIG. 2A.

In a PLM configuration, PLM EEs represent software environments that can execute other software. A PLM EE can be an Operating System (OS), a Virtual Machine Monitor (VMM), i.e. a hypervisor, or a Virtual Machine (VM). A PLM HE with computational capabilities can host a VMM or an OS. An OS can be the parent of other PLM EEs, i.e. VMMs, and VMs can be hosted on VMMs.

As for the AMF, a PLM metamodel is defined to capture the PLM configuration concepts, their relationships and their constraints. A portion of the PLM configuration metamodel 250 is shown in FIG. 2B. The PLM metamodel is based on the SA Forum PLM specification, but further refines the standard PLM concepts and their relationships. For instance, the PlmEE is specialized into PlmEEVM, PlmEEVMM, and PlmEEOS. The relationship among these concepts has also been redefined: The relationship between the PlmEEVM and the PlmEEVMM is defined through the PlmDependency. In the PLM configuration 200 of FIG. 2A, dashed lines are used between the VMs and their current hosting VMM, which is one of the VMMs listed in the dependency (not shown in the figure). The PlmEEVM has an association with its PlmEEOS. The PlmEEOS may have an association with a PlmEEVMM, i.e. by hosting it.

These refinements are used to appropriately handle virtualized environments and cloud architectures. Multiple layers of PlmHEs may exist in a PLM configuration, e.g. in the PLM configuration 200 of FIG. 2A, there are HEHosts which are hosting the VMMs and the OS, while these Hosts are themselves residing on HERacks. Following the same approach as for the AMF UML profile, the PLM UML profile is defined by mapping the PLM configuration metamodel to the UML metaclasses, with the closest semantics.

The integration relations among the fragments. According to the SA Forum specifications, each AMF Node is hosted on (mapped to) a PlmEE so that the software entities of the AmfNode can be executed and provide services. This is basically the connection point between the two configuration fragments. It is assumed herein that this PlmEE is an OS instance installed on a VM instance. Therefore, an AMF Node is mapped to a PlmEEVM, and this is how the two configurations are put into relation. The question is whether any mapping between the AMF Nodes and the PLM EEs is acceptable.

This question is hereafter addressed in the following through examples explaining the specific property of the system to be targeted in the integration of configuration fragments.

Figure 3:
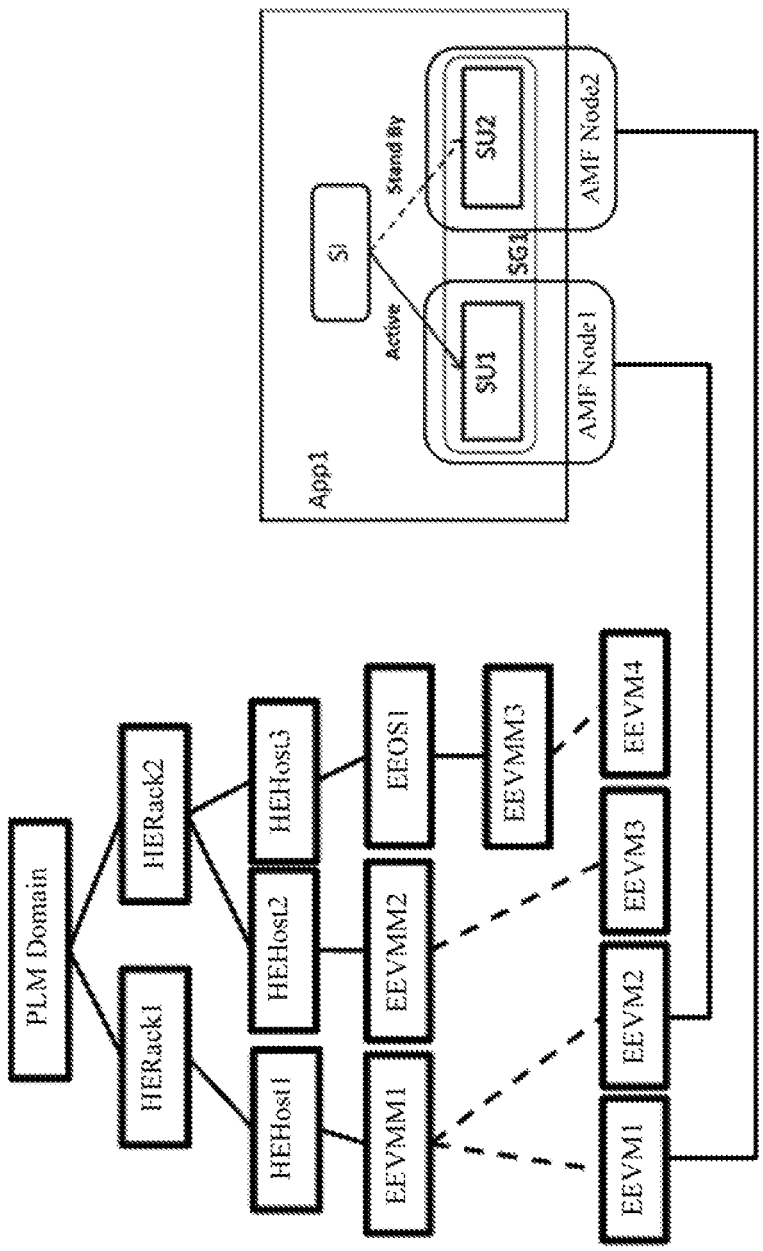
FIG. 3 illustrates an example in which the AMF configuration of FIG. 1A is mapped to the PLM configuration of FIG. 2A according to one embodiment.

Hardware disjointness of service providers for enabling availability will be discussed in relation with FIG. 3, which illustrates a simple example in which the AMF configuration 100 from FIG. 1A is put into relation with the PLM configuration 200 of FIG. 2A by mapping AMFNode1 and AMFNode2 to EEVM2 and EEVM1 respectively. These two VMs are running on the same VMM and PLM HE (HEHost1). At this point the PLM HE as well as the VMM represent single points of failure. If this HEHost1 crashes both service providers, SU1 and SU2 will be lost and a service outage will be inevitable. Even if in the initial PLM configuration the VMs (EEVM1 and EEVM2) are hosted on different EEVMMs, at runtime the VMs may migrate and end up on the same VMM and HE at the same time. To avoid any single point of failure due to the hosting hardware, it should be ensured that the service providers (SUs) of an SG cannot be hosted on the same host.

Figure 4:
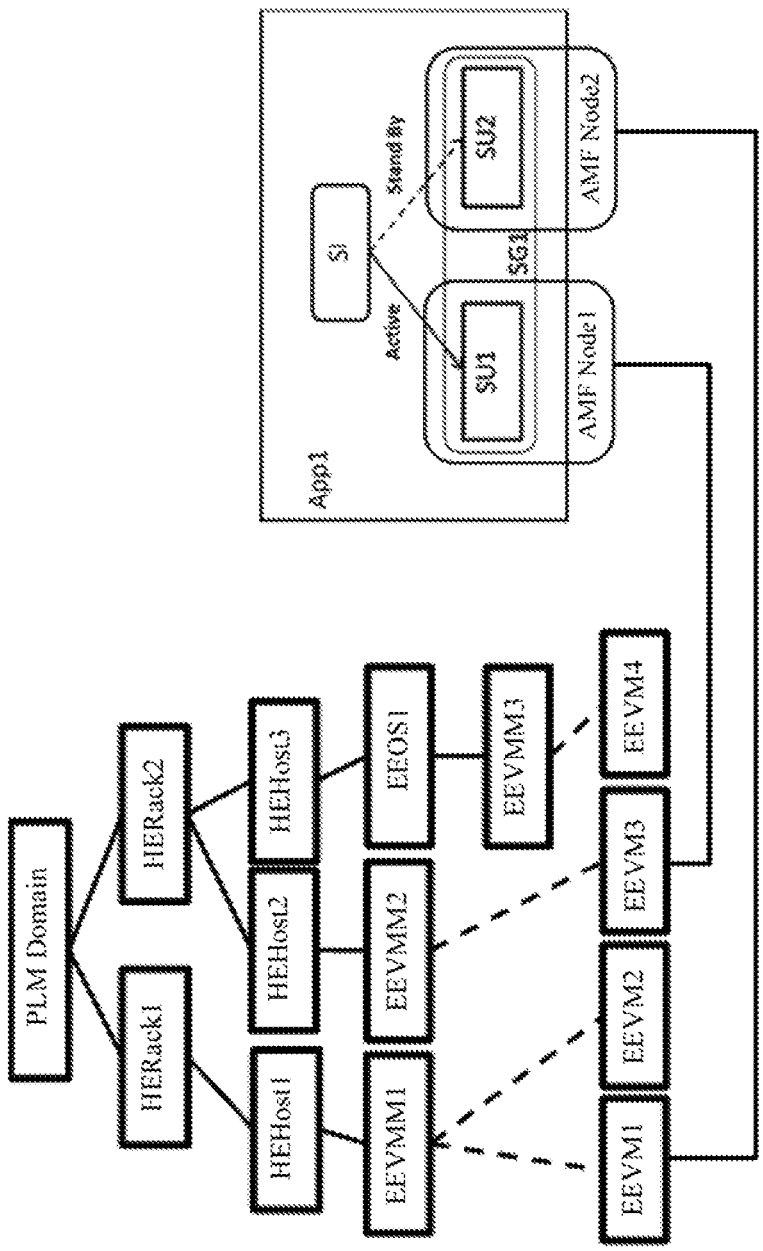
FIG. 4 illustrates another example in which the AMF configuration of FIG. 1A is mapped to the PLM configuration of FIG. 2A according to one embodiment.

Hardware affinity of service providers for fast communication is discussed below. As mentioned earlier, AMF manages redundant service providers (SUs) to avoid service outage due to SU failure. When the SU with the active assignment fails, AMF shifts the active assignment to the standby SU. To be able to use the standby SUs, the state of the active and the standby providers need to be synchronized so that in case of SU failure the assignment of the service can be shifted without any service interruption. The active and standby SUs of an SG need to synchronize continuously and this state synchronization introduces some communication overhead causing latency in the normal behavior. The latency increases when the hosts of the SUs are farther from each other. In the example of FIG. 4, SU1 is hosted on HEHost2 and HERack2 while SU2 is hosted on HEHost1 and HERack1. As the two SUs are residing on different HERacks, the latency is higher compared to the configuration in which the SUs are on the same HERack. Therefore, the SUs are placed closely together to assure an efficient communication (state synchronization) among the SUs of an SG and reduce this latency.

A combination of hardware availability and affinity is discussed next. Each of the previous examples (hardware disjointness or affinity) shows an example of a property that may be targeted by a particular approach of integration of the configuration fragments. Moreover, more complex properties such as the conjunction of both hardware affinity and disjointness may be targeted. An example of such a conjunction may be: the SUs are to be hosted on different hosts but the hosts are to keep certain proximity such as being in the same rack or site to assure the fast synchronization among the redundant SUs. This cannot be achieved with the static mapping of the traditional weaving technique.

These examples of relations between the entities of the configuration fragments are examples of consistency rules which are captured and taken into account at the integration of the fragments. Moreover, these targeted relations/consistency rules become the constraints that will guard the consistency of the system configuration against runtime modifications.

Figure 5:
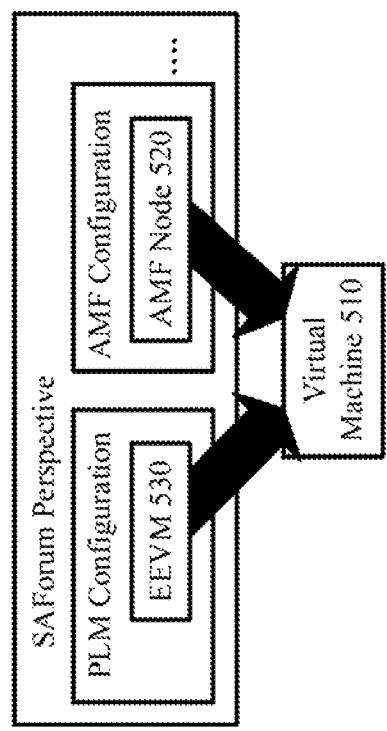
FIG. 5 illustrates different representations of a VM in an AMF configuration and a PLM configuration according to one embodiment.

Before describing the model driven integration approach, the challenges of the configuration integration are discussed first. A first challenge is overlapping entities. A configuration fragment is a logical representation of the resources for the management of their organization. A resource may exist in multiple configuration fragments with different logical representations. An example of a resource with multiple representations is a VM. As shown in FIG. 5, a VM 510 is represented in the AMF configuration as an AMF Node 520 and the same VM 510 in the PLM configuration is represented as an EEVM 530. Managing or modifying the overlapping entities (e.g. the entities with multiple logical representations) independently in each configuration fragment will lead to inconsistency in the system as they all affect the same resource. Thus, these logical representations of the same entity need to be related.

A second challenge is integration relations between configuration fragments. The integration of configuration fragments usually targets certain properties for the system configuration. These targeted properties depend on and may involve more than one aspect of the system, thus the relations between these aspects need to be captured and described. The hardware disjointness and affinity relations discussed previously are such examples. The relations between the configuration fragments need to be defined properly and according to the targeted properties. These relations need to be enforced by the integration to define a consistent system configuration that exhibits the targeted properties such as availability or latency.

The overall approach is presented in the following description. A model weaving technique is extended to integrate configuration fragments. In this technique, a model called the weaving model is used to capture the mappings between the entities of the metamodels. As any model in the model driven paradigm, the weaving model conforms to a metamodel, i.e. the weaving metamodel. The weaving metamodel describes the types of the mappings that can be used in the weaving model. It also describes the types of entities which can be connected through these mapping types, i.e. the link end types. The instances of the mapping types (or link types) are used in the weaving model to connect the models'/metamodels' entities. The weaving model can have different applications such as defining traceability, tool interoperability, model transformation, etc.

As discussed earlier, for the integration of configuration fragments, more complicated relations are captured among the fragments than just the entity mappings. Therefore, the weaving concept is extended in order to capture the semantics of the relations among the configuration fragment entities, and this semantics is used for the integration of the fragment models.

In the model driven integration approach, the configuration fragments and their metamodels are represented as the source models and source metamodels. For example, the AMF and PLM configuration models are the source models and their UML profiles are the source metamodels. Additionally, a system configuration metamodel called the target metamodel is used. At this stage, the target metamodel is a union of the source metamodels without any relationship between them. Through the weaving, the source models are integrated and a system configuration, i.e. the target model, is generated.

Figure 6:
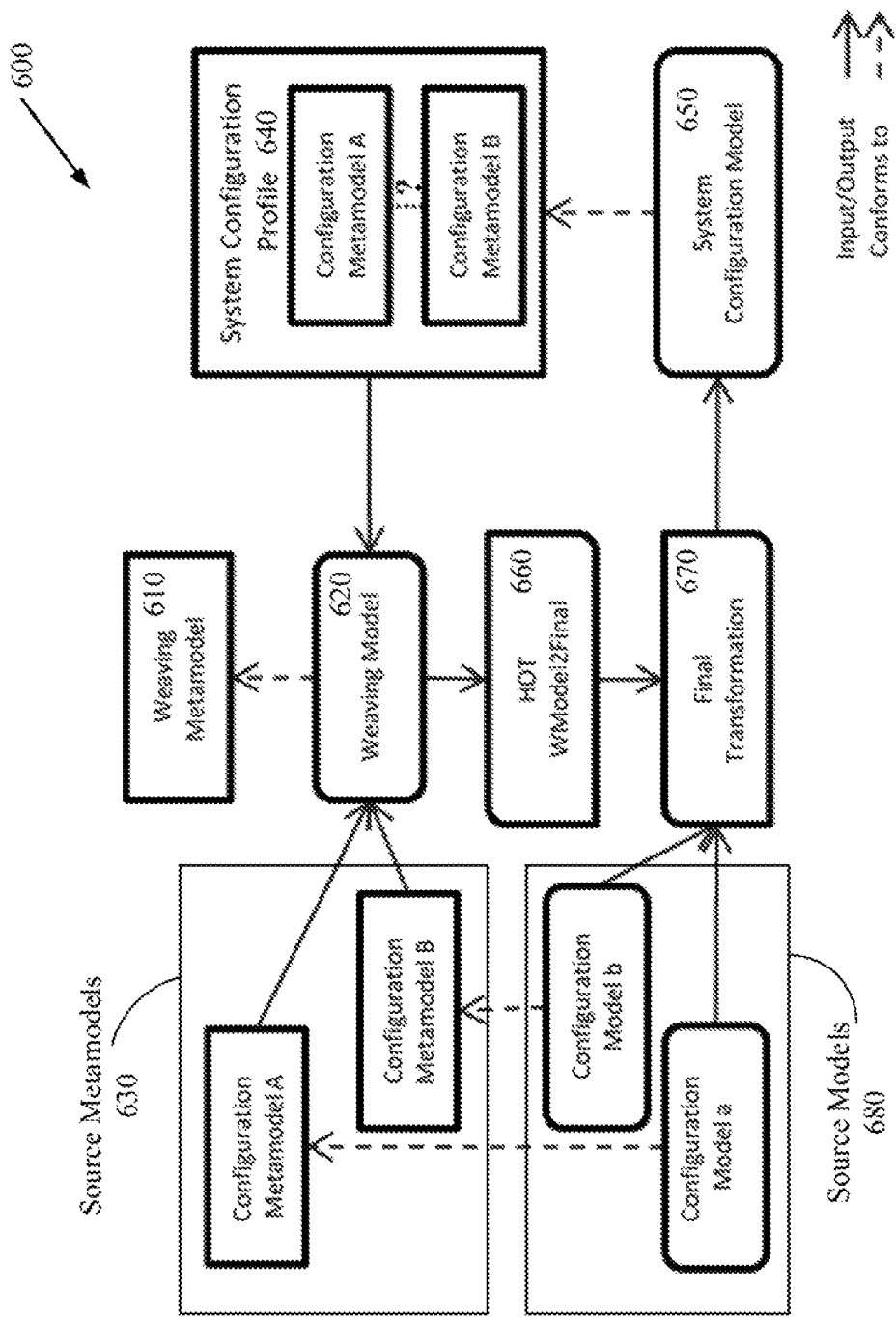
FIG. 6 illustrates an overall process of configuration integration through model weaving according to one embodiment.

In one embodiment, the weaving metamodel is extended with special link types. A weaving model is created by defining the links between the configuration entities of the source and target metamodels. The weaving model is a static representation of the relations among the entities; therefore, it is translated to an executable format using a Higher Order Transformation (HOT). The result of the HOT transformation is another transformation called Final Transformation which takes the source configuration models (e.g. the AMF and PLM configuration models) as the input and generates the target configuration model (i.e. the system configuration model) as the output. The overall process 600 of the configuration integration through model weaving is shown in FIG. 6 according to one embodiment. In the following the process 600 is summarized.

Figure 7:
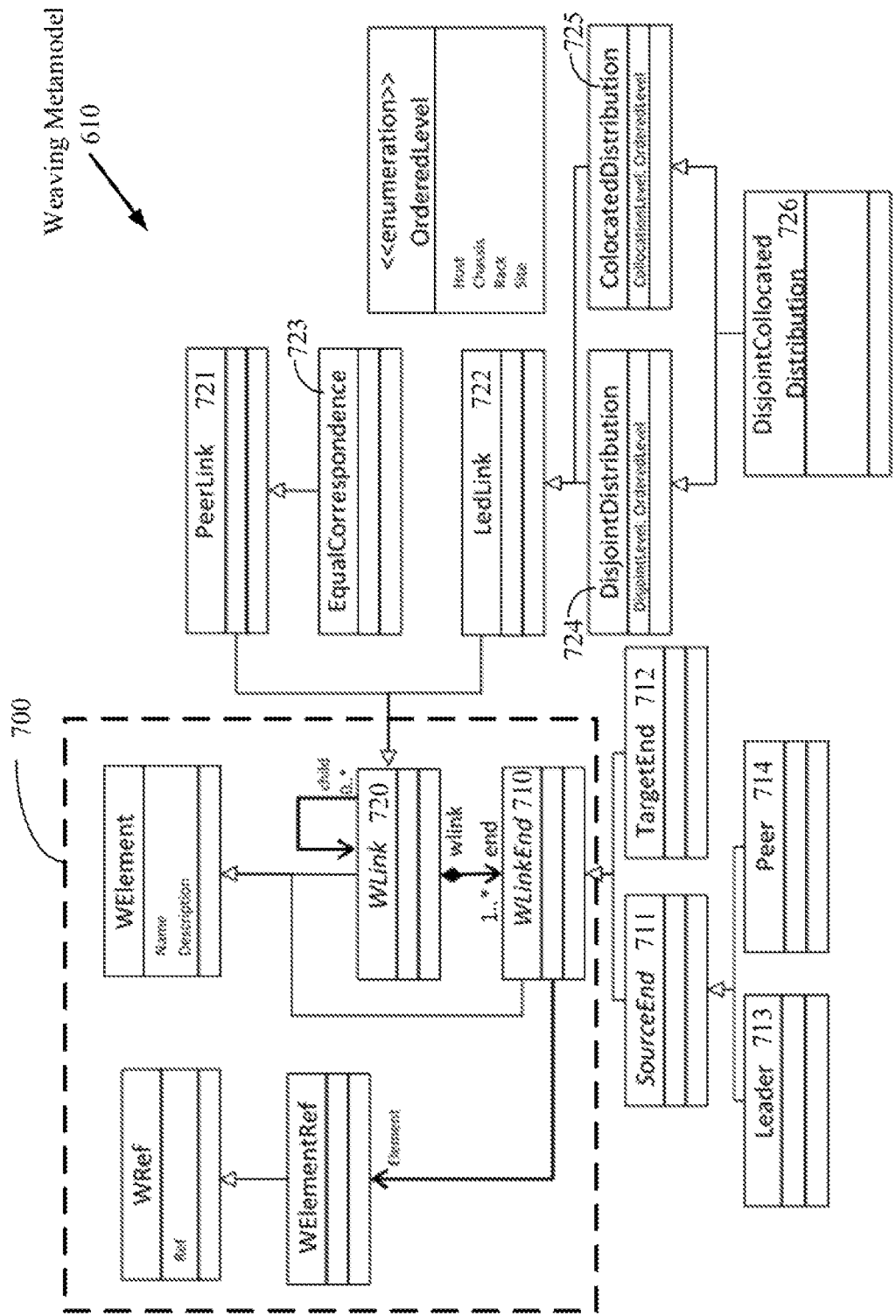
FIG. 7 illustrates an extended weaving metamodel according to one embodiment.

FIG. 6 illustrates a weaving metamodel 610, which defines the link types and the link end types that can be used in the weaving model. The weaving metamodel 610 is an extension to a generic weaving metamodel. We will come back to this figure further below. FIG. 7 illustrates part of a generic weaving metamodel (in a dotted rectangle 700). This generic weaving metamodel is extended in order to capture the special relations between the configuration fragments. The elements extending the metamodel are shown in FIG. 7 outside the dotted rectangle 700. In the following these extensions are explained in detail.

A first extension is WLinkEnd 710 specializations. The WLink 720 represents a link type which maps the WLinkEnds 710. For configuration integration, a direction is added to the links to distinguish the source and target ends of the links, as the source models are input and the target model is to be created as output. Therefore, the WLinkEnd 710 is considered as an abstract class, and is specialized into the SourceEnd 711, which is used to represent the configuration entities from the source models, and the TargetEnd 712 to represent the created/modified configuration entities which will appear in the target model (i.e. the system configuration). To make sure that each link has at least one SourceEnd 711 and one TargetEnd 712, constraint C1 is defined on the WLink 720. This constraint is expressed in the Object Constraint Language (OCL) as:

---

Context WLink
Inv C1: Self.end->exists (e1, e2: WLinkEnd | e1.oclIsKindOf (SourceEnd) AND e2.oclIsKindOf (TargetEnd))

---

The entities of the source configuration metamodels that are specified as the SourceEnd 711 are called the Source entities. The entities of the target metamodel appear in the TargetEnd 712 and are called the Target entities. They are linked to the Source entities by the WLink 720.

The SourceEnd 711 is specialized further into Leader link end 713 and Peer link end 714 in the weaving metamodel 610 to capture the influence of the configuration entities on each other. More specifically, when a configuration entity is specified as a Peer and it is linked to a Target entity, it means that the Target entity is created/modified with respect to the Peer Source entity (or Peer entity for short). However, if the Peer entity also appears in the target model (i.e. created through the same or another link), these entities (the Peer and the Target entities) would have equal influence on each other in the target model. In the other words, if either of them changes later in the target model, it can impact the other one.

Similar to the Peer link end 714, the Leader link end 713 is another specialization of the SourceEnd 711. Configuration entities specified as the Leader Source entities (Leader entities for short) also create/modify the Target entities but in contrast to the Peer entities, if the Leader entities appear in the target model (i.e. created through other links), only the Leader entities can influence the Target entities in the target model and not the other way around. This means that later in the target model if the Leader entities change, this change impacts their created/modified Target entities. But if those Target entities change, they cannot impact the Leader entities.

A second extension is WLink 720 specializations. TheWLink 720 is further specialized into PeerLink 721 and LedLink 722. The PeerLink 721 represents the relation of the Peer Source entities and their Target entities. Defining a PeerLink 721 among the Peer and Target entities means that even though the Peer entities are used to create/modify the Target entities the relation is not unidirectional. In the target model the relation is bidirectional, that is, the Target entities can have equal impact on the Source entities and vice versa. They are all in a Peer relation with respect to the constraints implied by the creation/modification rule.

A structural constraint, C2 is defined for the PeerLink 721 to assure that the PeerLink 721 has only Peer link end 714 as its SourceEnd 711.

---

Context PeerLink
Inv C2: Self.end->forAll (e: WLinkEnd | e.oclIsKindOf(SourceEnd) implies e.oclIsTypeOf(Peer))

---

In the configuration integration, many entities from the source models are just copied to the target model. The EqualCorrespondence 723 link type is defined to map the Source entities to their identical Target entities. EqualCorrespondence 723 is a specialization of the PeerLink 721 so the Peer link end 714 is used as the SourceEnd 711 for this link type and the TargetEnd 712 is the other link end for this link type.

The LedLink 722 represents the relation of the Leader Source entities and the Target entities. It means that when a LedLink 722 is defined among the Leader and Target entities, the Leader entities create/modify the Target entities and such impact or effect among the entities (i.e. Leader entities impact the Target entities) needs to be maintained in the target model among the involved entities.

A structural constraint, C3 is defined for the LedLink 722 to assure that the LedLink 722 has only Leader link end 713 as its SourceEnd 711. This constraint is expressed in OCL as:

---

Context LedLink
Inv C3: Self.end->forAll (e: WLinkEnd | e.oclIsKindOf(SourceEnd) implies e.oclIsTypeOf (Leader))

---

The DisjointDistribution 724 link type is defined to capture the hardware-disjointness property for the target configuration. DisjointDistribution 724 is an extension of the LedLink 722, and therefore the Leader link end 713 and also the TargetEnd 712 needs to be specified for the link. This link type has an attribute called DisjointLevel of an enumeration type OrderedLevel. The OrderedLevel enumeration has the items of Host, Chassis, Rack, Site, and Geographic which define the levels of disjointness for the configuration entities. For example, in the scenario explained earlier, if the DisjointLevel attribute is set to Host, then the linked entities are configured on different Hosts. If this attribute is set to Rack, for instance, the linked entities are configured for different Racks. The values of the OrderedLevel type are defined following the Open Virtualization Format (OVF) specification.

The CollocatedDistribution 725 link type is defined similarly to the DisjointDistribution 724 but with another purpose; to capture the collocation requirement in relations between the entities of the fragments. CollocatedDistribution 725 is also specialized from LedLink 722 and has a CollocationLevel attribute. This link guarantees that the target entities are configured for groups of collocated source entities. For example in a previous use case if it is required that the SUs are configured on the HEs of the same Rack, the CollocationLevel is set to the required level, i.e. Rack.

As mentioned earlier, a system configuration may require both availability and affinity of the service providers. However, these properties can be conflicting; thus, they are considered independently when both are required. To capture such relation another link type, DisjointCollocatedDistribution 726, is added which inherits from both CollocatedDistribution 725 and DisjointDitribution 724, and thus has the properties of both. To make sure that the two concepts are not introducing any conflict, each concept is applied at a different level. This means that the level of providing availability through DisjointDistribution 724 is different from the affinity level provided by the CollocatedDistribution 725. The DisjointLevel and CorelationLevel attributes allows such distinction to be made. The selection of these levels respects a rule; they are not selected arbitrarily. In defining this rule, the OVF specification is followed which indicates that the collocation property is to be provided at a higher level than the disjointness. This means that, for example, if the disjointness is provided at Host level, then the collocation level can be Chassis, Rack, Site or Geographic. This rule can be specified with an OCL constraint in the weaving metamodel as:

---

Context DisjointCollocatedDistribution
Inv C4: OrderedLevel.allInstances( ) ->indexOf(self .DisjointLevel) < OrderedLevel.allInstances( )->indexOf (self.CollocationLevel)

---

Referring back to FIG. 6, the next step is to create the links in a weaving model 620. Once the required link types have been defined in the weaving metamodel 610, they can be used in the weaving model 620 for relating entities of the source metamodels 630 to the entities of the target metamodel (i.e. the system configuration profile 640). The weaving model 620 includes instances of links (instances of link types) associated with their respective link ends. Examples of these links are described in the following for EqualCorrespondence 723 and DisjointDistribution 724 link types.

The DisjointDistribution 724 link type of the weaving metamodel 610 is used to represent the disjointness relation among the relevant entities. In the example of the integration of the AMF and PLM configurations, if a fixed hardware platform is used and accordingly the PLM configuration is fixed and cannot be changed as part of the integration, then the AMF entities (i.e. the Nodes, NGs and SUs) are to be configured according to the entities of the relevant PLM configuration (i.e. VMs and HEs) to satisfy the hardware disjointness constraint. Thus, in the DisjointDistribution 724 link the PlmEEVM and PlmHE entities of the PLM configuration metamodel are the Leader SourceEnd 711 and the AmfNode, AmfNG, and AmfSU are the TargetEnds 712. The application of this link type with Host disjointness is as follows:

```
<<WLink>> DisjointDistribution HEDisjointSUs
    <DisjointLevel>
        OrderedLevel Host
    <Source>
        <<Leader>>    PlmEEVM
        <<Leader>>    PlmHE
    <Target>
        <<TargetEnd>> AmfNode
        <<TargetEnd>> AmfNG
        <<TargetEnd>> AmfSU
```

In detail, this link indicates that the AmfNode, AmfNGs and AmfSU entities in the target model are created or modified with respect to the PlmEEVM and PlmHEHost. These creations/modifications happen in such a way that Host disjointness is provided for the AmfSUs. The CollocatedDistribution 725 is used in a similar manner.

An instance of the EqualCorrespondence 723 link type is used to map an entity of a source metamodel to a similar entity of the target metamodel. Some semi-automated methods, such as the technique introduced in Del Fabro et al, Semi-Automatic Model Integration using Matching Transformations and Weaving Models, ACM SAC, 963-970 (2007), can be applied to automate the creation of the mappings based on the similarity (such as string or type similarity) of the elements. Such automation can be applied only after all other types of links have been defined in the weaving model.

```
<<WLink>> EqualCorrespondence EqualVMs
    <Source>  <<Peer>>       PlmEEVM
    <Target>  <<TargetEnd>>  SystemEEVM
```

The following description explains how the links are translated to transformation rules to create the target model with respect to the semantics of the relations (links).

Referring again to FIG. 6, to generate a system configuration model 650 from the weaving model 620, first the weaving model 620 is translated into an executable format. This translation takes place using an HOT 660, which itself is a transformation. The HOT 660 translates the links of the weaving model 620 into transformation rules. The output of the HOT 660 is a Final Transformation 670.

For instance, the translation of the DisjointDistribution 724 link results in several transformation rules. In one embodiment, Atlas Transformation Language (ATL) is used as the model transformation language for the implementation of the HOT 660 translation. In one embodiment, the translation may be performed using an algorithm described in Jahanbanifar et al, Providing Hardware Redundancy for Highly Available Services in Virtualized Environments, 8th IEEE International conference on Software Security and Reliability (SERE), San Francisco (2014), to create hardware disjoint groups of VMs and the respective AmfNodeGroups to configure the AmfSUs on the AmfNodeGroups. In an alternative embodiment, a different algorithm may be used.

The high level overview of these ATL rules and a brief description of each are provided hereafter:

```
rule NodeVM_Association_Creation(id: Sequence(Integer))
rule VMG_Creation( )
rule NG_Creation(vmg: Sequence(OclAny))
rule SUNG_Association_Creation(su:AMF!AmfSU,index:Integer)
```

The NodeVM_Association_Creation rule creates a relation (an association) between each distinct pair of PlmEEVM and AmfNode, e.g. associating an AmfNode to the most similar PlmEEVM regarding the capacity of the two entities. The association of a PlmEEVM to an AmfNode entity can be seen as an attribute of the AmfNode in the target model. This relation is the base connection between the entities of the two configuration models.

The VMG_Creation rule is used to generate the Host hardware disjoint VM Groups (VMGs) based on the input PLM configuration model according to the previously-mentioned algorithm of Jahanbanifar et al. The isolation of this calculation in a rule makes its modification or replacement by another algorithm easy and avoids touching the rest of the transformation model. This rule creates VMGs (each of which is a sequence of VMs) collected in a VMGSet (which is a sequence of sequences in ATL). The VMGSet and its VMGs do not appear in the target configuration but are used to create an NGSet and its NGs.

The NG_Creation rule creates the AmfNGs in the target model based on the previously created VMGs of the VMGSet and adds the relevant AmfNode entities to the created AmfNG. In the translation, it is assumed that there are no AmfNG entities in the AMF model, so they are created in the target model. Alternatively, if the AMF model contains the AmfNGs, they can be re-configured instead of being created, which may be limited by additional constraints.

Finally the SUNG_Association_Creation rule is used to establish the relation (association) between the AmfSUs of each AmfSG and an AmfNG entity which was created by the previous rule. The criteria for matching the AmfSUs to AmfNGs are not considered. This rule can be extended in the future by adding different heuristics for selecting the most appropriate AmfNG for each AmfSU based on some criteria (such as the number of AmfSUs in the AmfSG, etc.)

The Final Transformation 670 generated from the HOT 660 takes the configuration fragment models (i.e., source models 680) as input and generates the system configuration model 650 as output. The generated configuration has all the entities of both input models, and also the new entities and relations among the entities of the configuration fragments capturing the special properties entailed by the weaving links.

The transformation rules in the Final Transformation 670 are generated by considering the special relations among the entities of the configuration fragments. These relations guarantee the targeted properties of the system configuration, i.e. the consistency of the system configuration with respect to the targeted properties such as availability and affinity.

Integration semantics originates from the transformation rules and describes the semantics of the relation between the configuration fragments. Although this integration semantics is taken care of in the process of generating the system configuration model 650, it has yet to be reflected in the system configuration profile 640. This integration semantics will be defined as integration constraints in the system configuration profile 640 in order to guard the consistency of system configuration model 650 against unsafe runtime modifications. The integration constraints, in addition to the union of the constraints of the configuration fragments, form the system configuration constraints. The transformation rules of the Final Transformation 670 can be reused to generate automatically the integration constraints. The configuration designer does not have to define them manually as they are already embedded in the transformation rules.

Figure 8:
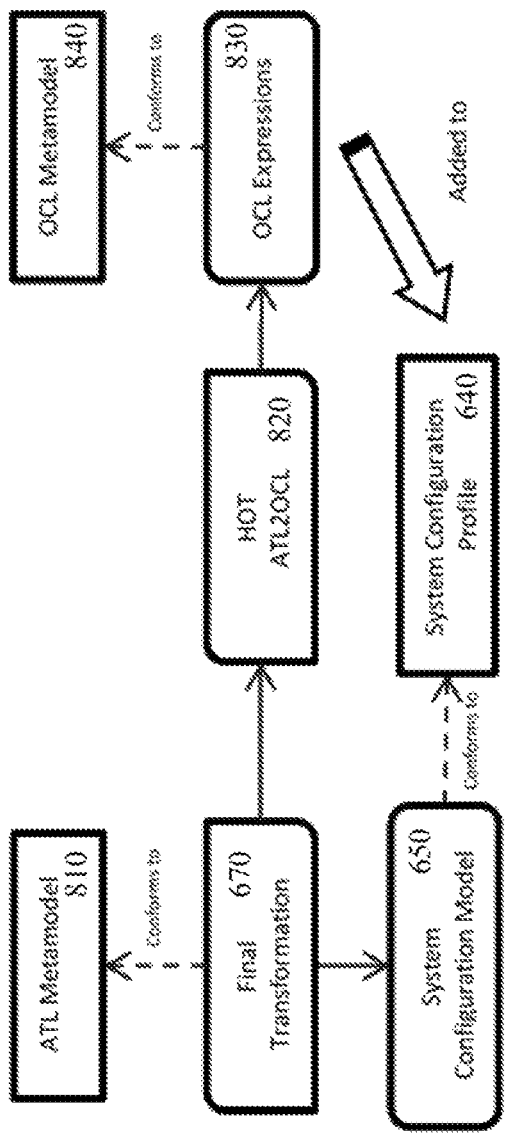
FIG. 8 illustrates integration constraints generation from a final transformation according to one embodiment.

FIG. 8 illustrates the generation of integration constraints from the Final Transformation 670 and the completion of the system configuration profile 640 according to one embodiment. In one embodiment, the integration constraints are generated as OCL expressions 830 from the transformation rules (e.g. ATL transformation rules) of the Final Transformation 670. The OCL expressions 830 conform to an OCL metamodel 840. In one embodiment, the Final Transformation 670 is an ATL transformation model conforming to an ATL metamodel 810.

An ATL transformation model consists of rules and helpers. There are three types of transformation rules in ATL: matched rules, lazy rules and called rules. A most commonly used rule type is the matched rule which generates the target entities from the source entities defined by the source pattern of the rule. A matched rule is executed for all the occurrences of its source pattern. In contrast to the matched rule, a lazy rule is executed only when it is invoked. Finally, called rules are used to create target entities from imperative code. To be executed, the called rules need to be invoked from an imperative code, which can be the action block of a matched rule, or from within another called rule. Helpers in the context of ATL are similar to methods. The helpers can be called from different points of an ATL program.

In one embodiment, the integration constraints may be generated using derivation trees. Each target entity or its attribute is created by some transformation rules and helpers. If the entity is created in a rule and its attributes are created in some other rules, the attribute creation is considered as an entity modification. By following the transformation rules and helper invocations for the creation/modification of each target entity, the process of its creation/modification can be specified as a derivation tree. At the root of the tree there is a target entity, and at each level of the tree the nodes are the entities which are used to create their parent node. The edges are the operations that are applied on the nodes to create the parent node. An operation can be a rule/helper invocation, a filter or guard expression, or a piece of imperative code in the rules. At the last level of the tree are the leaves (entities) which already exist in the target model or the source models. Although the derivation tree can be created for each target entity, the following descriptions focus on only the target entities that are created or modified using some operations.

Traversing a derivation tree from the root to the leaves describes how a target entity is created or modified. A derivation tree helps in identifying the operations of which the effects need to be captured as constraints between the entities of the system configuration.

Figure 9:
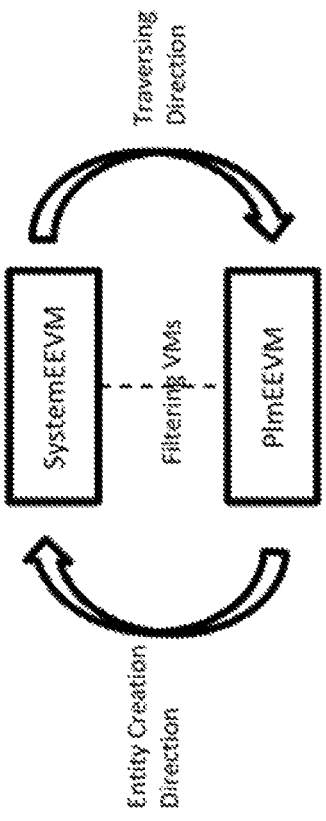
FIG. 9 illustrates an example of a derivation tree according to one embodiment.

FIG. 9 illustrates a simple example of a derivation tree for creating the Sys-temEEVM from the PlmEEVM. A simple transformation rule called VM_Transformation is used to copy the PlmEEVM entities from the PLM configuration fragments to the system configuration and to create the SystemEEVM entities. This rule is the translation of the previously-mentioned EqualVMs link (i.e. an EqualCorrespondence weaving link). We assume that only the VMs with Memory of 512 MB or higher are to be used for the target entity creation. Therefore, the source pattern used in the VM_Transformation rule uses a filter on the entities of the source. The target entity node (SystemEEVM) is created from the filtered source node (PlmEEVM) which is shown as Entity creation direction in FIG. 9. The filter is an example of an operation that can be applied to source entities, it is shown on the edge connecting the nodes. Other operations can be helpers, called rules, or lazy rules. The derivation tree is traversed starting from the target entity, following the transformation rule creating it, to reach the source entity to which the filter operation was applied. This is shown as Traversing direction in FIG. 9.

```
rule VM_Transformation {
    from source:PLM!PlmEEVM(source.Memory>512)
    to target: System! SystemEEVM(
        Memory<– source.Memory ) }
```

More examples of derivation trees are shown in FIGS. 10A, 10B and 10C, which are based on the DisjointDistribution 724 link and its respective transformation rules. FIG. 10A shows the derivation tree of the modification of the AmfNode entity to map it to a VM in the PLM configuration fragment (the association between the AmfNode and PlmEEVM is considered as an attribute of the AmfNode). This tree has only one level and the operation on the edge between the root (AmfNode) and the leaf (PlmEEVM) is the rule NodeVM_Association_Creation rule, i.e. a called rule which selects a distinct PlmEEVM for the AmfNode possibly based on some other criteria such as the capacity of the VM.

FIG. 10B shows the derivation tree for the creation of the AmfNG. This tree has two levels: level 1 includes the AmfNode and the VMG tree nodes on which the NG_creation operation (i.e. a called rule for creating NGs from the VMGs) was applied at this level. As the AmfNode exists in the system model, it is a leaf node of the tree. On the other hand, no VMG entity exists in the source or the target models. It is an entity which is only created and used in the transformation rules as an auxiliary entity. The VMG entity represented by the VMG node of the tree is created from the PlmHE, PlmDependency and PlmEEVM entities of the system model. To preserve any constraint implied by these operations in relation to the AmfNG, these entities (i.e. PlmHE, PlmDependency and PlmEEVM entities) are included as the tree nodes in level 2 of the derivation tree. The VMG_Creation (i.e. a called rule) and the HE_Checking (i.e. a helper) are the operations applied on the nodes of level 2 to create their parent which is the VMG.

FIG. 10C shows the derivation tree for the modification of the AmfSU entity (the association between the AmfSU and AmfNG is considered as an attribute of the AmfSU). This tree has only one level and the operation on the edge between the root (AmfSU) and the leaf (AmfNG) is the SUNG_Association_Creation rule (i.e. a called rule which selects a distinct NG for the AmfSUs).

Once a derivation tree is created, an appropriate OCL expression is derived from the operations applied on the nodes of each level. The context of a generated OCL expression at each level is the parent entity if this entity exists in the target model. For example for the tree of FIG. 10A, AmfNode is the parent node and it is a target entity, which exists in the target model, therefore the context of the generated OCL expression from this tree is AmfNode. It is noted that the context of a generated OCL expression at the root level is the parent entity (root), because the root is a target entity and therefore it is in the target model.

However, at any level (except for the root level) of the tree if a parent does not exist in the target model (i.e. the parent is an auxiliary entity which is only used in the transformation) then the parent entity cannot be the context of the OCL expression generated for its subtree. In such cases, the context is the same as for the level above, e.g. the parent of this parent. An example of this case is the VMG entity in the tree of FIG. 10B, which is created from the PlmHE, PlmDependency and PlmEEVM entities, but the VMG entity does not exist in the target model. So the context of the OCL expression created from the VMG_Creation and HE_Checking cannot be the VMG and is defined as for the level above, i.e. the parent of the VMG entity in the tree, which is the AmfNG.

To derive the OCL expression, the ATL operations and the OCL expression are respectively categorized into types, and a mapping between the types is defined. Table 1 summarizes the ATL operation types that are identified for common ATL operations, as well as the mappings of these ATL operation types to OCL expression types. These mappings are then defined as an HOT transformation (i.e. the ATL2OCL transformation 820 of FIG. 8). Thus, the mappings are reused for similar operations.

TABLE 1

The mapping of ATL operations to OCL expressions

| ATL Operation Type | OCL Expression Type |
|---|---|
| Type operations in the filters (operations on primitive or collection types, e.g. select, iterate, so on) | Type operations as the invariant of constraint |
| Matched rules with iterative binding of entities' attributes (e.g. for loop) | Defined by allInstances or forAll expressions |
| Variables in the Using section | Defined by let expression |
| Helpers, Lazy rules, Called rules | Defined as the Body of Query operations |

The OCL expressions resulting from applying this mapping to the derivation trees of FIGS. 10A, 10B and 10C are shown in Table 2.

TABLE 2

The OCL expressions resulting from the derivation trees of FIG. 10

| Tree | ATL Operation | Operation Description | OCL Expression |
|---|---|---|---|
| a | NodeVM_Association_Creation | It maps each VM to a distinct Node. It requires PlmEEVM | Context AmfNode<br>Inv:<br>self.allInstances->forAll(N1,N2\| N1 <> N2 implies N1.vm <>N2.vm ) |
| b | Applied on Level2: VMG_Creation HE_Checking | They are called to create the VMG. They require the PlmHE, the PlmDependency and the PlmEEVM | Context<br>AmfNG::Disjointness(Ng1,Ng2):Boolean<br>Body :<br>If ( Ng1.node -> iterate (N; VMM1: PlmEEVMM \| VMM1->including (N.vm.dependency.supplier))-> iterate (VMM; HE1: PlmHE \| HE1->including (VMM.he)) ->intersection(Ng2.node -> iterate (N; VMM2: PlmEEVMM \|VMM2-> including (N.vm.dependency.supplier) )->iterate (VMM; HE2 : PlmHE \| HE2->including (VMM.he)) -> isEmpty( ) )<br>then return True else return False endIf |
|  | Applied on Level1: NG_Creation | It is called to create the NGs. It requires the VMG and the AmfNode | Context AmfNG<br>Inv:<br>self.allInstances->forAll(Ng1,Ng2\| Disjointness(Ng1,Ng2)=True) |
| c | SUNG_Association_Creation | It modifies the SUs. It iterates over the SUs of each SG to associate each SU with a distinct NG | Context AmfSU<br>Inv:<br>self.allInstances->forAll(Su1,Su2\| Su1.sg=Su2.sg implies Su1.ng <>Su2.ng ) |

Note that for the tree in FIG. 10B, Level 2 defines the Disjointness method in the context of the AmfNG, which is referenced at Level 1.

In addition to the generation of the OCL expressions, the role of constrained entities can also be captured in the constraints. The OCL can be extended by defining Leader/Follower/Peer roles for the constrained entities to show the influence of the entities over each other. FIG. 11 illustrates the extension of the constraints with the leadership information according to one embodiment.

A similar leadership concept may be used in the weaving process. Thus, the Leader/Follower/Peer role of constrained entities in the integration constraints can be obtained automatically. Referring again to FIG. 7, the entities specified as the Leader SourceEnd 711 of the LedLink 722 take the Leader role and entities specified as the TargetEnd 712 of the LedLink 722 have the Follower role in the constraint generated from the LedLink 722 and its transformation rules.

In the other link types (i.e. PeerLink 721), the SourceEnd 711 is Peer and therefore, both the Peer Source entities and the Target entities of the link will have the Peer role in the LeadershipInfo of the generated constraint as they have equal influence over each other in the target model.

In the DisjointDistribution 724 weaving link between the AMF and PLM configurations, the PlmEEVM and the PlmHE (the Leader Source entities) have an influence on the AmfNode, AmfNG and AmfSU (the Target entities). Accordingly, in the generated constraint the PlmEEVM and the PlmHE entities have the Leader role and can affect the AmfNodes, AmfNGs and the AmfSUs which have the Follower role in the LeadershipInfo of the corresponding constraints.

It is worth mentioning that the roles of the constrained entities may change with the application scenario. More specifically, the Leader/Follower/Peer roles may be defined for the entities for the initial design time of a configuration to meet the setup and deployment requirements. However, after the system is deployed and the requirements change, the system may be limited in the changes allowed. Therefore, the roles of the entities in the constraint may change although the OCL constraint remains unchanged. Defining the roles for the entities through the LeadershipInfo allow the roles to be defined and changed whenever it is needed without affecting the constraints themselves. The LeadershipInfo can also be defined for the other constraints of the system configuration (i.e. the constraints of the configuration fragments).

Although the model driven integration approach has been described in the context of the SA Forum middleware configuration fragments, it is applicable to other domains where the configuration fragments are integrated. The model driven integration approach is based on the model weaving technique and focuses on the semantics of the relations in the weaving. Examples of such semantics include the hardware disjointness property (to ensure hardware redundancy for redundant software entities to increase the availability of the system), the hardware collocation property (to decrease the communication latency due to state synchronization), or the combination of the two.

Defining special link types in the weaving metamodel allows for the development of more abstract mappings. Abstracting concepts is an intrinsic feature of metamodeling, which is discussed widely in the literature. In the case of configuration integration, it increases the reusability of link types since the defined link types can be used in future mappings when other configuration fragments need to be added. As those configuration fragments belong to the same system, there is a fair chance that they require similar link types for their mappings (e.g. using the "EqualCorrespondence" link type). The abstract definition of link types further allows for the selection of the desirable interpretation and implementation for the mapping. This means that the declarative definition of the link types can be translated according to the features of the system. Considering the "DisjointDistribution" link type, this link may be interpreted with the assumption that there is a predefined PLM configuration with specific entities that are fixed and cannot be modified. The AMF configuration is forced to use the VM groups that are defined according to this predefined PLM configuration. Another interpretation of the "DisjointDistribution" may consider the AMF configuration as a fixed and unchangeable model, and use other heuristics to try to change the PLM configuration in a way to still provide hardware redundancy for redundant software entities.

The model driven integration approach described herein preserves the relations between the entities of the configuration fragments at runtime, i.e. the targeted system properties also called system configuration consistency are preserved at runtime. Because the integration semantics is not defined initially in the system configuration profile, an automated constraint generation described herein reuses the transformation rules for the generation of the integration constraints. This automation reduces the risk of misinterpretation by different configuration designers of the integration relations.

The model driven integration approach described herein uses the Final Transformation 670 instead of the WModel2Final HOT 660 (FIG. 6) for constraint generation. This technique can also be used for other ATL transformations as well and it is not restricted only to weaving and integration transformations.

Figure 12:
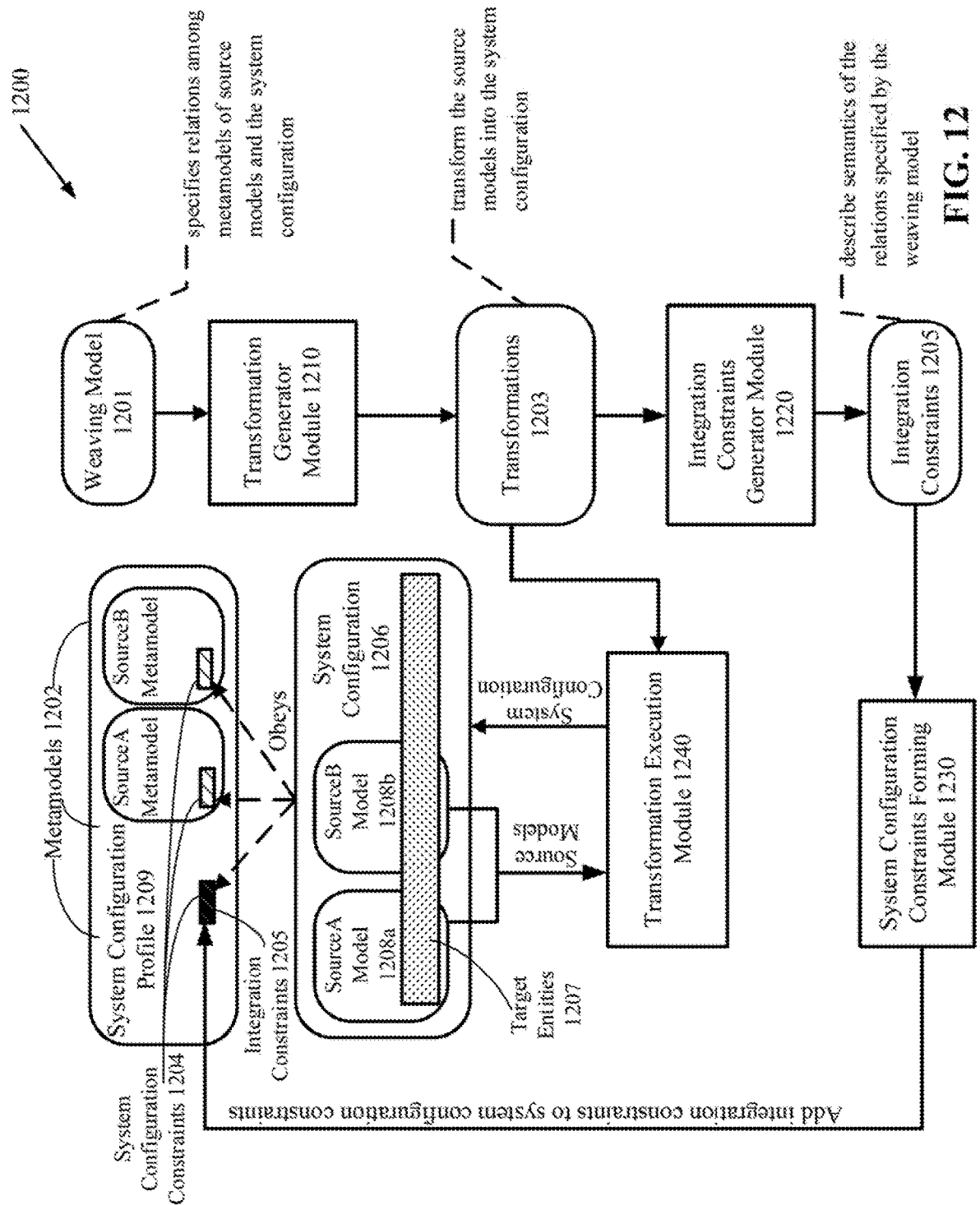
FIG. 12 illustrates a process for integrating source models into a system configuration according to an embodiment.

FIG. 12 illustrates a process 1200 for integrating source models into a system configuration according to one embodiment. In one embodiment, the process 1200 may be performed as a method 1300, shown in FIG. 13 as a flow diagram, for integrating source models into a system configuration according to one embodiment.

Figure 13:
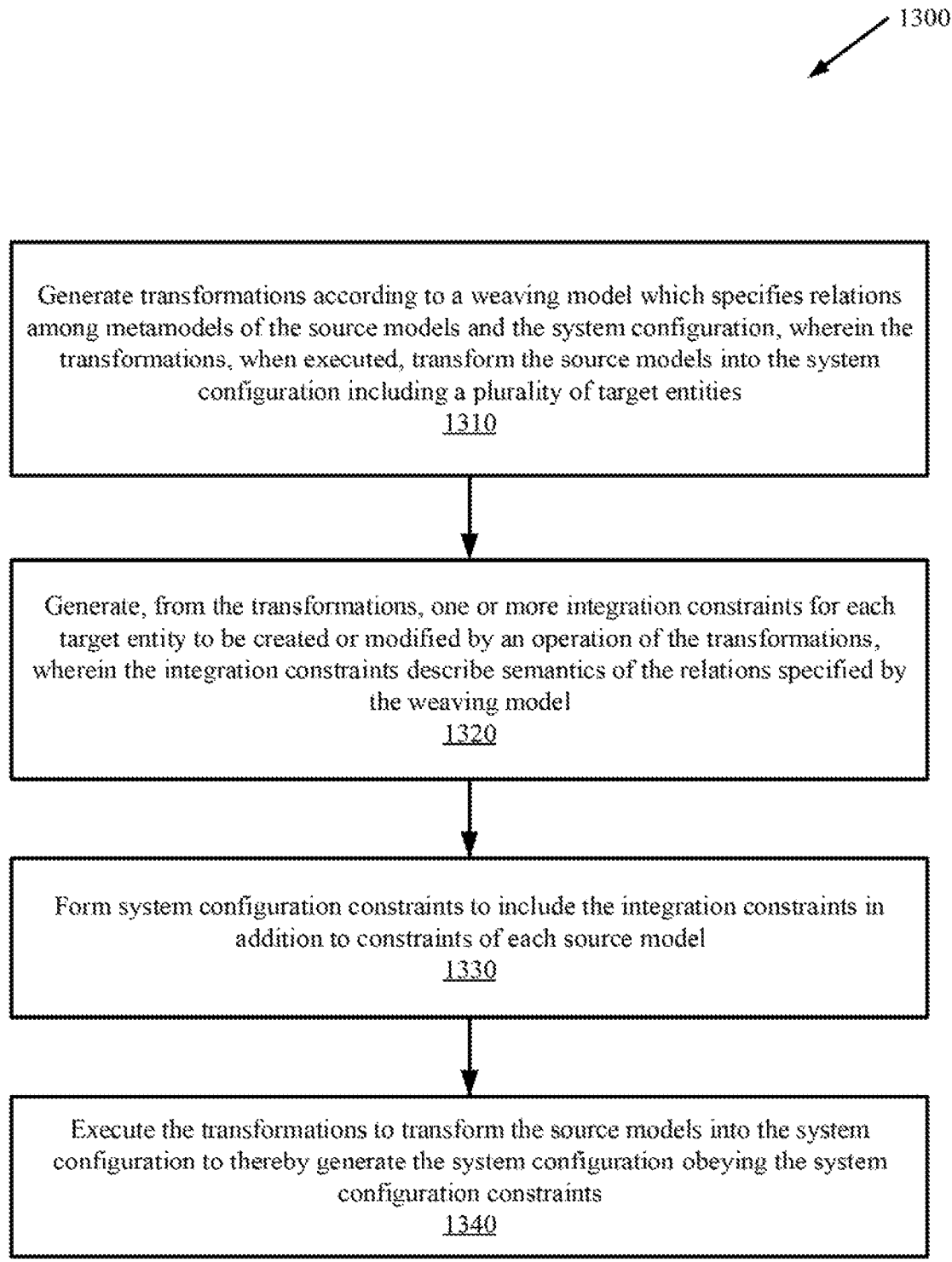
FIG. 13 is a flow diagram illustrating a method for integrating source models into a system configuration according to an embodiment.

Referring to FIG. 12 and FIG. 13, a transformation generator module 1210 receives a weaving model 1201 as input, and generates transformations 1203 at step 1310 according to the weaving model 1201. The weaving model 1201 specifies relations among metamodels 1202 of source models 1208a, 1208b and a system configuration 1206. The transformations 1203, when executed, transform the source models 1208a, 1208b into the system configuration 1206 which includes a plurality of target entities 1207. Although two source models are shown, it is understood that the system configuration 1206 may be generated by integrating more than two source models. From the transformations 1203, an integration constraints generator module 1220 generate one or more integration constraints 1205 for each target entity 1207 to be created or modified by an operation of the transformations 1203, at step 1320. The integration constraints 1205 describe semantics of the relations specified by the weaving model 1201. At step 1330, a system configuration constraints forming module 1230 forms system configuration constraints 1204 to include the integration constraints 1205 in addition to constraints of each source model 1208a, 1208b. More specifically, the integration constraints 1205 are the constraints between entity classes (i.e. classes of entities) of different source metamodels, and the source model constraints are the constraints between entity classes within each source metamodel.

At step 1340, a transformation execution module 1240 executes the transformations 1203 to transform the source models 1208a, 1208b into the system configuration 1206, to thereby generate the system configuration 1206 obeying the system configuration constraints 1204.

Figure 14:
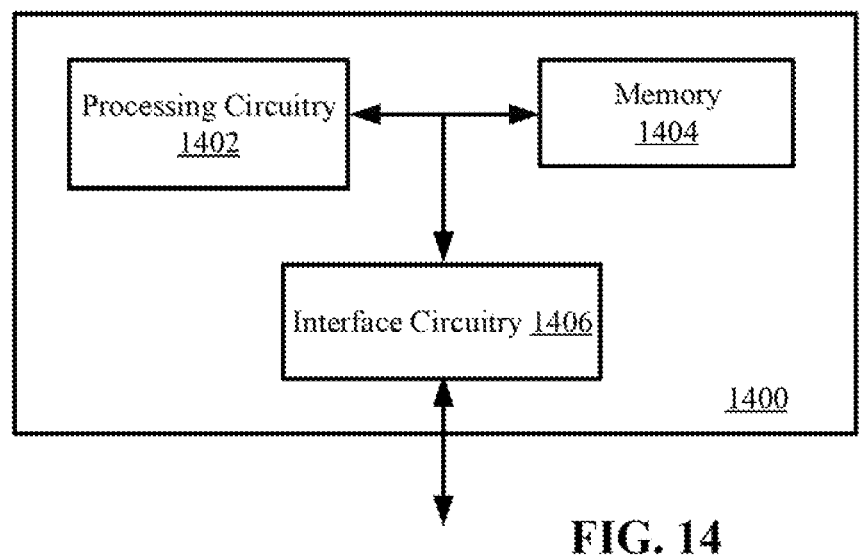
FIG. 14 illustrates a system or network node for integrating source models into a system configuration according to one embodiment.

FIG. 14 is a block diagram illustrating a system 1400 according to an embodiment. In one embodiment, the system 1400 may be a network node or server in an operator network or in a data center. The system 1400 includes circuitry which further includes processing circuitry 1402, a memory or instruction repository 1404 and interface circuitry 1406. The interface circuitry 1406 can include at least one input port and at least one output port. The memory 1404 contains instructions executable by the processing circuitry 1402 whereby the system 1400 is operable to perform the various embodiments as described herein, including the process 1200 of FIG. 12 and the method 1300 of FIG. 13.

Figure 15:
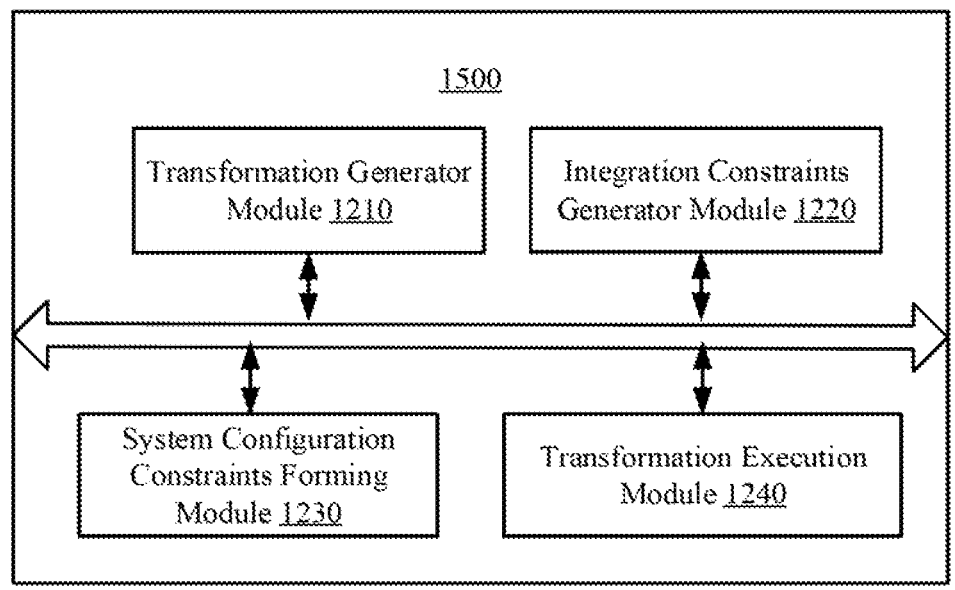
FIG. 15 illustrates a system or network node for integrating source models into a system configuration according to another embodiment.

FIG. 15 illustrates a system 1500 according to one embodiment. In one embodiment, the system 1500 may be a network node or server. The system 1500 may integrate source models into a system configuration. Referring also to FIG. 12, the system 1500 comprises the transformation generator module 1210, the integration constraints generator module 1220, the system configuration constraints forming module 1230 and the transformation execution module

1240. The transformation generator module 1210 is adapted or operative to generate transformations according to a weaving model which specifies relations among metamodels of the source models and the system configuration. The transformations, when executed, transform the source models into the system configuration including a plurality of target entities. The integration constraints generator module 1220 is adapted or operative to generate, from the transformations, one or more integration constraints for each target entity to be created or modified by an operation of the transformations. The integration constraints describe semantics of the relations specified by the weaving model. The system configuration constraints forming module 1230 is adapted or operative to form system configuration constraints to include the integration constraints in addition to constraints of each source model. The transformation execution module 1240 is adapted or operative to execute the transformations to transform the source models into the system configuration to thereby generate the system configuration obeying the system configuration constraints.

Figure 16:
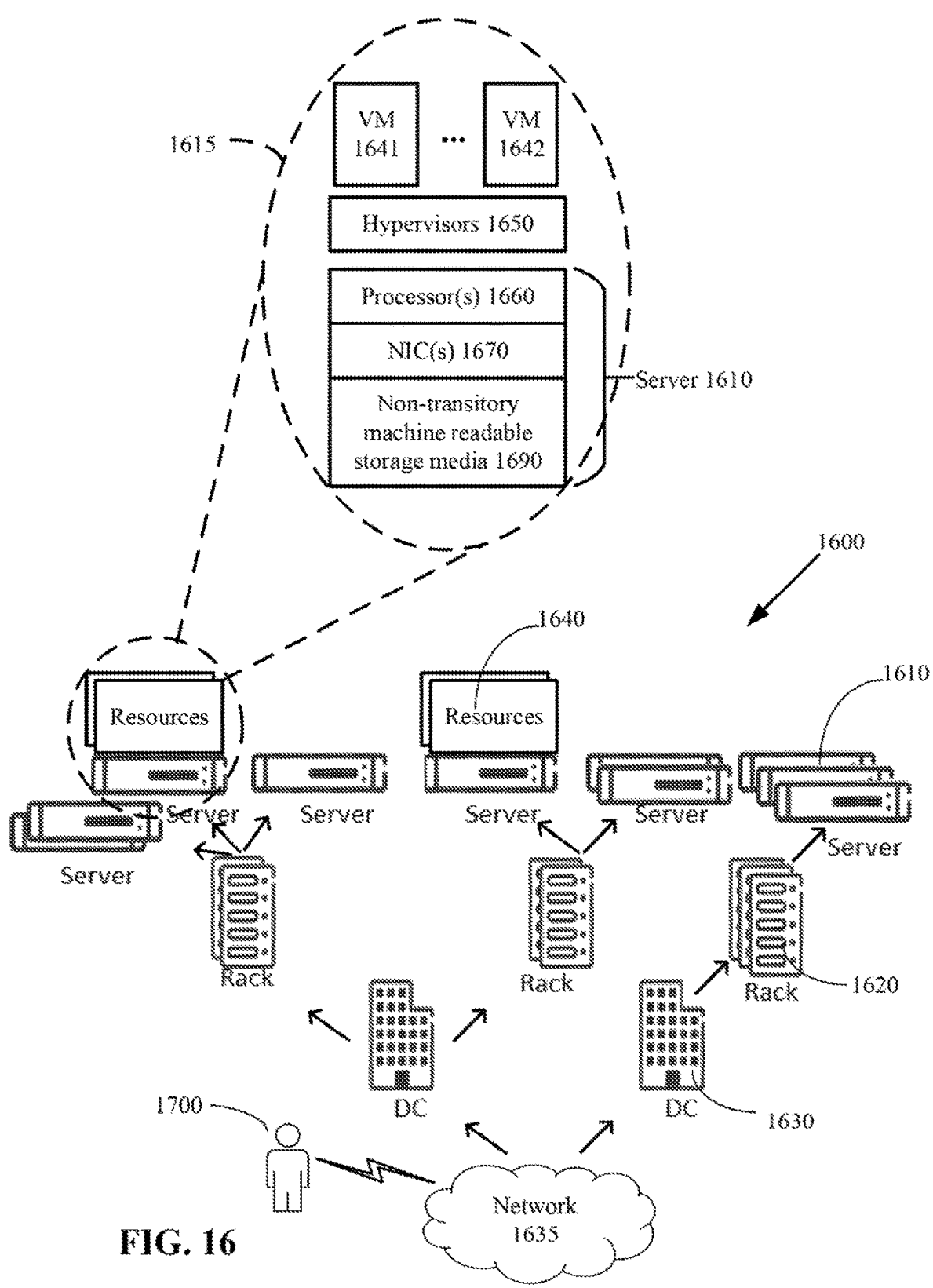
FIG. 16 is an architectural overview of a cloud computing environment according to one embodiment.

FIG. 16 is an architectural overview of a cloud computing environment 1600 that comprises a hierarchy of a cloud computing entities. The cloud computing environment 1600 can include a number of different data centers (DCs) 1630 at different geographic sites connected over a network 1635. Each data center 1630 site comprises a number of racks 1620, each rack 1620 comprises a number of servers 1610. It is understood that in alternative embodiments a cloud computing environment may include any number of data centers, racks and servers. A set of the servers 1610 may be selected to host resources 1640. In one embodiment, the servers 1610 provide an execution environment for hosting entities and their hosted entities, where the hosting entities may be service providers and the hosted entities may be the services provided by the service providers. The server 1610 may integrate source models into a system configuration according to the various embodiments as have been described herein.

Further details of the server 1610 and its resources 1640 are shown within a dotted circle 1615 of FIG. 16, according to one embodiment. The cloud computing environment 1600 comprises a general-purpose network device (e.g. server 1610), which includes hardware comprising a set of one or more processor(s) 1660, which can be COTS processors, dedicated Application Specific Integrated Circuits (ASICs), or any other type of processing circuit including digital or analog hardware components or special purpose processors, and network interface controller(s) 1670 (NICs), also known as network interface cards, as well as non-transitory machine readable storage media 1690 having stored therein software and/or instructions executable by the processor(s) 1660.

During operation, the processor(s) 1660 execute the software to instantiate a hypervisor 1650 and one or more VMs 1641, 1642 that are run by the hypervisor 1650. The hypervisor 1650 and VMs 1641, 1642 are virtual resources, which may run server instances in this embodiment. In one embodiment, the server instance may be implemented on one or more of the VMs 1641, 1642 that run on the hypervisor 1650 to perform the various embodiments as have been described herein.

In an embodiment the server instance instantiation can be initiated by a user 1700 or by a machine in different manners. For example, the user 1700 can input a command, e.g. by clicking a button, through a user interface to initiate the instantiation of the server instance. The user 1700 can alternatively type a command on a command line or on another similar interface. The user 1700 can otherwise provide instructions through a user interface or by email, messaging or phone to a network or cloud administrator, to initiate the instantiation of the server instance.

Embodiments may be represented as a software product stored in a machine-readable medium (such as the non-transitory machine readable storage media 1690, also referred to as a computer-readable medium, a processor-readable medium, or a computer usable medium having a computer readable program code embodied therein). The non-transitory machine-readable medium 1690 may be any suitable tangible medium including a magnetic, optical, or electrical storage medium including a diskette, compact disk read only memory (CD-ROM), digital versatile disc read only memory (DVD-ROM) memory device (volatile or non-volatile) such as hard drive or solid state drive, or similar storage mechanism. The machine-readable medium may contain various sets of instructions, code sequences, configuration information, or other data, which, when executed, cause a processor to perform steps in a method according to an embodiment. Those of ordinary skill in the art will appreciate that other instructions and operations necessary to implement the described embodiments may also be stored on the machine-readable medium. Software running from the machine-readable medium may interface with circuitry to perform the described tasks.

The above-described embodiments are intended to be examples only. Alterations, modifications and variations may be effected to the particular embodiments by those of skill in the art without departing from the scope which is defined solely by the claims appended hereto.

What is claimed is:

1. A method for integrating source models into a system configuration, comprising:
   generating transformations according to a weaving model which specifies relations among metamodels of the source models and the system configuration, wherein the transformations, when executed, transform the source models into the system configuration including a plurality of target entities;
   generating, from the transformations, one or more integration constraints for each target entity to be created or modified by an operation of the transformations, wherein the integration constraints describe the relations specified by the weaving model;
   forming system configuration constraints to include the integration constraints in addition to constraints of each source model; and
   executing the transformations to transform the source models into the system configuration to thereby generate the system configuration obeying the system configuration constraints.

2. The method of claim 1, wherein the integration constraints are between entity classes of different source metamodels, and the constraints of each source model are between entity classes within each source metamodel.

3. The method of claim 1, wherein generating the one or more integration constraints further comprises:
   constructing a derivation tree to specify a process of creating and modifying each target entity and one or more attributes of the target entity, wherein the target entity is at the root of the derivation tree and the derivation tree includes one or more levels.

4. The method of claim 3, wherein nodes at each level of the derivation tree are entities used to create or modify the nodes' parent nodes, and edges of the derivation tree are operations applied on the nodes to create or modify the parent nodes.

5. The method of claim 3, wherein generating the one or more integration constraints further comprises:
traversing from the root to generate an integration constraint for each node that is one of the target entities at each level of the derivation tree, wherein the integration constraint has a context which is the node's parent node if the node's parent node is one of the target entities, and the integration constraint further has an expression which is derived from an operation represented by an edge of the derivation tree that connects the node and the node's parent node.

6. The method of claim 5, wherein the context of the integration constraint is the same as a level above the node's level toward the root if the node's parent node is not one of the target entities.

7. The method of claim 1, wherein each integration constraint is specified by an Object Constraint Language (OCL) expression.

8. The method of claim 7, further comprising:
categorizing rules of the transformations into a first set of types;
categorizing OCL expressions into a second set of types; and
identifying a mapping between the first set of types and the second set of types.

9. The method of claim 1, wherein the one or more integration constraints describe the relations among the metamodels in terms of hardware disjointness, hardware affinity, or a conjunction of hardware disjointness and hardware affinity.

10. The method of claim 1, wherein each integration constraint includes leadership information for constrained entities based on a role that each constrained entity takes in a transformation rule, wherein the role includes one of a leader role, a follower role and a peer role.

11. The method of claim 1, further comprising:
extending a generic weaving metamodel to create a weaving metamodel to which the weaving model conforms, wherein the weaving metamodel defines link ends that are specialized into a SourceEnd representing entities in the source models, and a TargetEnd representing created or modified entities in the system configuration.

12. The method of claim 11, wherein the weaving metamodel defines link types including one or more of: a DisjointDistribution link type to capture a hardware-disjointness property, a CollocatedDistribution link type to capture a collocation property, and a DisjointCollocatedDistribution link type that inherits both the hardware-disjointness property and the collocation property.

13. A network node comprising processing circuitry and memory, said memory containing instructions executable by said processing circuitry to integrate source models into a system configuration, whereby said network node is operative to:
generate transformations according to a weaving model which specifies relations among metamodels of the source models and the system configuration, wherein the transformations, when executed, transform the source models into the system configuration including a plurality of target entities;
generate, from the transformations, one or more integration constraints for each target entity to be created or modified by an operation of the transformations, wherein the integration constraints describe the relations specified by the weaving model;
form system configuration constraints to include the integration constraints in addition to constraints of each source model; and
execute the transformations to transform the source models into the system configuration to thereby generate the system configuration obeying the system configuration constraints.

14. The network node of claim 13, wherein the integration constraints are between entity classes of different source metamodels, and the constraints of each source model are between entity classes within each source metamodel.

15. The network node of claim 13, wherein the network node is further operative to:
construct a derivation tree to specify a process of creating and modifying each target entity and one or more attributes of the target entity, wherein the target entity is at the root of the derivation tree and the derivation tree includes one or more levels.

16. The network node of claim 15, wherein nodes at each level of the derivation tree are entities used to create or modify the nodes' parent nodes, and edges of the derivation tree are operations applied on the nodes to create or modify the parent nodes.

17. The network node of claim 15, wherein the network node is further operative to:
traverse from the root to generate an integration constraint for each node that is one of the target entities at each level of the derivation tree, wherein the integration constraint has a context which is the node's parent node if the node's parent node is one of the target entities, and the integration constraint further has an expression which is derived from an operation represented by an edge of the derivation tree that connects the node and the node's parent node.

18. The network node of claim 17, wherein the context of the integration constraint is the same as a level above the node's level toward the root if the node's parent node is not one of the target entities.

19. The network node of claim 13, wherein each integration constraint is specified by an Object Constraint Language (OCL) expression.

20. The network node of claim 19, wherein the network node is further operative to:
categorize rules of the transformations into a first set of types;
categorize OCL expressions into a second set of types; and
identify a mapping between the first set of types and the second set of types.

21. The network node of claim 13, wherein the one or more integration constraints describe the relations among the metamodels in terms of hardware disjointness, hardware affinity, or a conjunction of hardware disjointness and hardware affinity.

22. The method of claim 13, wherein each integration constraint includes leadership information for constrained entities based on a role that each constrained entity takes in a transformation rule, wherein the role includes one of a leader role, a follower role and a peer role.

23. The network node of claim 13, wherein the network node is further operative to:
extend a generic weaving metamodel to create a weaving metamodel to which the weaving model conforms, wherein the weaving metamodel defines link ends that are specialized into a SourceEnd representing entities in the source models, and a TargetEnd representing created or modified entities in the system configuration.

24. The network node of claim 23, wherein the weaving metamodel defines link types including one or more of: a DisjointDistribution link type to capture a hardware-disjointness property, a CollocatedDistribution link type to capture a collocation property, and a DisjointCollocatedDistribution link type that inherits both the hardware-disjointness property and the collocation property.

25. A method for integrating source models into a system configuration, comprising:
- instantiating a server instance in a cloud computing environment which provides processing circuitry and memory for running the server instance, said server instance being operative to:
- generate transformations according to a weaving model which specifies relations among metamodels of the source models and the system configuration, wherein the transformations, when executed, transform the source models into the system configuration including a plurality of target entities;
- generate, from the transformations, one or more integration constraints for each target entity to be created or modified by an operation of the transformations, wherein the integration constraints describe the relations specified by the weaving model;
- form system configuration constraints to include the integration constraints in addition to constraints of each source model; and
- execute the transformations to transform the source models into the system configuration to thereby generate the system configuration obeying the system configuration constraints.

* * * * *